United States Patent [19]
Lin

[11] Patent Number: 6,167,515
[45] Date of Patent: Dec. 26, 2000

[54] METHOD AND SYSTEM FOR PERFORMING THE TRANSMISSION OF PRIVATE DATA OVER A PUBLIC NETWORK

[75] Inventor: Ho-Shyan Lin, Hsinchu, Taiwan

[73] Assignee: Winbond Electronics Corp., Hsinchu, Taiwan

[21] Appl. No.: 09/089,167

[22] Filed: Jun. 2, 1998

[30] Foreign Application Priority Data

Mar. 17, 1998 [TW] Taiwan .................................. 87103968

[51] Int. Cl.$^7$ ..................................................... G06F 1/24
[52] U.S. Cl. .......................... 713/160; 713/161; 713/171; 713/182; 380/255; 380/277
[58] Field of Search ..................... 713/160, 161, 713/168, 171, 182, 184, 200, 201, 202; 380/255, 277

[56] References Cited

U.S. PATENT DOCUMENTS

| | | |
|---|---|---|
| 4,170,714 | 10/1979 | Branscome et al. ......................... 380/9 |
| 4,291,386 | 9/1981 | Bass ......................................... 708/252 |
| 4,628,504 | 12/1986 | Brown ...................................... 370/458 |
| 4,630,108 | 12/1986 | Gomersall ................................. 348/13 |
| 5,256,863 | 10/1993 | Ferguson et al. ......................... 380/24 |

*Primary Examiner*—Thomas R. Peeso
*Attorney, Agent, or Firm*—Ladas & Parry

[57] ABSTRACT

A method and system for performing private transmission between some special network nodes of a public network. First, a network node serving as a transmitter sends a format packet incorporating user-defined check polynomial coefficients to another network node serving as a receiver. The receiver network node separates the coefficient information and loads it to a universal checker. While transmitting the private data, packets containing the private data have a check data generated by using the user-defined coefficients. Then the receiver network node can employ the universal checker to verify the reception of these packets containing the private data. When the private data transmission finishes, the transmitter network node sends a recovery packet to the receiver network node for ending the private data transmission.

16 Claims, 4 Drawing Sheets

METHOD AND SYSTEM FOR PERFORMING THE TRANSMISSION OF PRIVATE DATA OVER A PUBLIC NETWORK

BACKGROUND OF THE INVENTION

1. Field of the Invention

The present invention relates in general to a network transmission technology and network system. More specifically, the invention relates to a method and system for performing private transmissions between special network nodes of a public network, such as open local area networks (hereafter referred to as LAN).

2. Description of the Related Art

Building a private network for the transmission of private data is costly due to the expense of installing a private cable line between two distant network. For this reason, private networks are not frequently used except under special circumstances, such as the connection of government or military equipment.

In addition, most networks are open, which means that all of the network nodes in the network can access the data being transmitted in the wiring of the network. For example, Ethernet is one of the most frequently used open networks. FIG. 1 (Prior Art) illustrates a sample network topology diagram of the Ethernet. As shown in FIG. 1, there are four network nodes connected to the network Ethernet 10, which are denoted by node 1, node 2, node 3 and node 4. When a network node sends a data packet to another network node, for example, from node 1 to node 2, all network nodes in the network can receive this data packet, including node 2, which serves as the real destination of the data packet, and nodes 3 and 4, which are not the destination of the data packet. Each network node can judge the real destination of the currently transmitted data packet by the information in the destination address (DA) contained therein.

FIG. 2 (Prior Art) schematically illustrates a packet template defined in the Ethernet. As shown in FIG. 2, packet 30 consists of several fields. These fields are preamble 31, destination address (DA) 32, source address (SA) 33, data length 34, data 35 and FCS field 39. Preamble 31 contains synchronizing information and is manipulated by the physical layer protocol. DA 32 and SA 33 are used to indicate the destination node and the source node of the transmitted packet, respectively. Generally, these addresses correspond to the serial number of the network card installed in the network node. Data length 34 represents the data length of the following data 35 in bytes and data 35 is used to store the data being sent. FCS field 39 stores a check data, also called cyclic redundant check codes (CRC) of packet 30, which is used detect any transmission errors in the packet. The data stored in FCS field 39 is generated by a CRC polynomial generating function G(x). For example, according to the Institute of Electrical and Electronic Engineering (IEEE) 802.3 standard, G(x) is defined as $x^{32}+x^{26}+x^{23}+x^{22}+x^{16}+x^{12}+x^{11}+x^{10}+X^{8}+x^{7}+x^{5}+x^{4}+x^{2}+x+1$.

Return to the transmission example illustrated in FIG. 1. Under the normal Ethernet protocol, when node 1 transmits a packet to Ethernet 10, each of the nodes 2, 3 and 4 can receive this packet. Then these nodes check the data stored in FCS field 39 of the received packet and determine whether any transmission errors occurred. If the check result reveals the existence of a transmission error, the received packet will be removed. On the other hand, if the check result reveals no error, these network nodes will further check whether the destination address stored in DA 42 matches with their own network addresses. If the destination address does not match with the network address, then the received packet will be dropped out.

According to the above-indicated description, packets transmitted under the normal network protocol can be captured by all network nodes connected to the network. While the network nodes should abandon packets having inconsistent destination addresses under the normal network protocol, it is evident that invaders could readily modify monitor programs to intercept packets that are sent to other network nodes. In other words, private transmission over a public Ethernet cannot be directly implemented.

Privately transmitting data over a public network requires the construction of a private transmission path, such as path 10a shown in FIG. 1, for blocking the access of other network nodes to the transmitted data. Encryption/Decryption is one of the most frequently used techniques in the conventional art. The network node on the transmitter end first encrypts data by using an encryption key and transmits the encrypted data to the network. The network node on the receiver end then decrypts the received data by using a corresponding decryption key and acquires the needed data. During the transmission, other network nodes can still intercept this encrypted data, but are unable to acquire effective data due to the deficiency of an appropriate decryption key. Therefore, private data transmission is achieved.

However, one of the drawbacks of the conventional encryption/decryption scheme is that both sides require a pair of consistent encryption/decryption keys before the private transmission is performed. In addition, the selected encryption/decryption keys cannot be randomly changed during the transmission in order to prevent data loss. One way to solve these problems is to put the encryption/decryption keys on the network as common data, which can then real-time synchronize the consistency of the pair of encryption/decryption keys employed by the transmitter and receiver. However, it is evident that such a communication technique can not ensure the privacy of the encryption/decryption keys.

SUMMARY OF THE INVENTION

Therefore, an object of the present invention is to provide a method and system for performing private transmissions over a public network, allowing special network nodes to perform private data transmissions. In addition, the method and system must work in such a manner that the private transmissions can not be recognized by other network nodes that are not one of the communication terminals.

The present invention achieves the above-indicated objects by providing a method for performing private transmissions between a first network node and a second network node of a public network. The first network node, serving as the transmitter end, has a check-data generator, which can generate a check data in response to the data ready for transmission by using a set of user-defined check polynomial coefficients. In the Ethernet environment, the check data can be stored in the FCS field of a packet. The second network node, serving as the receiver end, has a universal checker, the state of which can be altered by loading the set of user-defined check polynomial coefficients. The universal checker can check the check data corresponding to the set of the user-defined check polynomial coefficients.

At the beginning of a private transmission, the first network node sends a format packet, which includes the information of the user-defined check polynomial coefficients, to the second network node. After receiving the format packet, the second network node separates the information of the user-defined check polynomial coefficients from the format packet and loads it to the universal checker. Then the first network node generates check data in response to the private data ready for transmission by using the check-data generator. The check data and the corresponding private data are packed into a data packet for transmission to the second network node. The data packet generated by the first network node has the same packet format as the usual one. However, since the check-data generating manner is unique, other network nodes regard this data packet as incorrect and drop it out. Only the second network node can successfully verify the check data contained in the data packet and receive it. The remaining private data can be transmitted, according to the above-indicated procedure, from the first network node to the second network node. After completing the private-data transmission, the first network node then sends a recovery packet, which contains the information of the original check polynomial coefficients defined in the network, to the second network node for recovering the status of the universal checker in the second network node. After receiving the recovery packet, the second network node loads the original check polynomial coefficients into the universal checker to recover the standard network status.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

The method and system disclosed in the present invention uses the property of the check data in the packets, such as the CRC check codes stored in the FCS field in the Ethernet environment, to achieve the purpose of private transmission. As described above, the check data is used to verify whether any transmission-induced error occurs in the packet during the transmission process. Therefore, the first step taken after a network node receives a packet from the network is to check the check data to ensure the correctness of the received packet. Then the network node identifies the presumed destination network node. If the destination address contained in the received packet does not match its own network node, the network node will drop out the received packet. In the present invention, the network nodes that serve as the transmitter and the receiver during the private transmission adopt user-defined generating/checking polynomials for the check data that are different to those defined in the network. Therefore, when packets encapsulated by the private data are transmitting, other network nodes regard these packets as erroneous and abandon them. A preferred embodiment in accordance with the present invention is described as follows. This embodiment is applied to the Ethernet. However, it is understood by those skilled in the art that the technique disclosed in the preferred embodiment, by using appropriate modifications, can also be applied to other networks.

Figure 1:
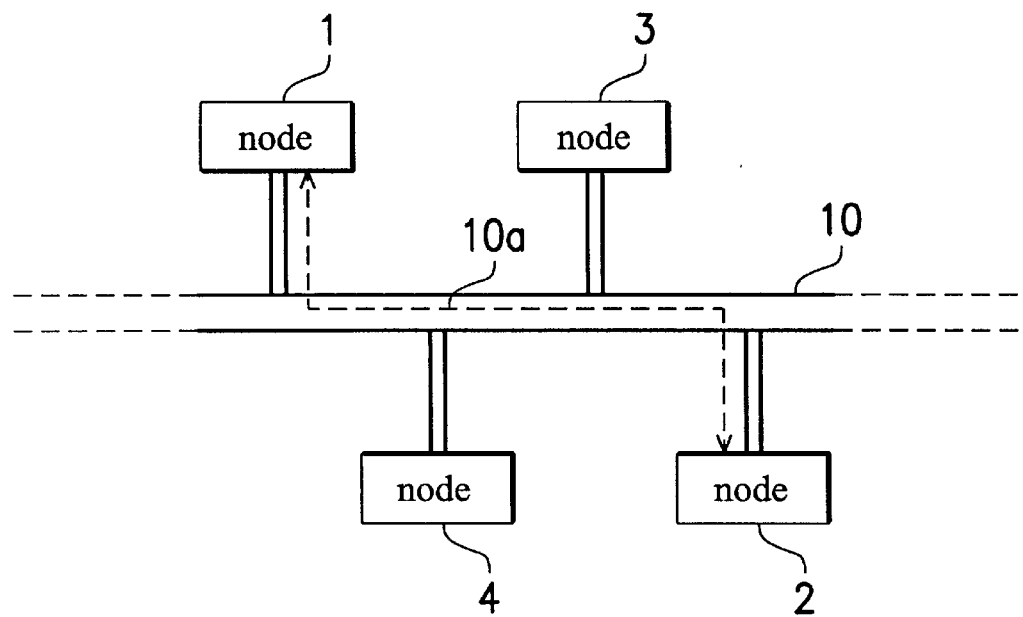
FIG. 1 (Prior Art) illustrates a network topology of a local area network implemented by the Ethernet.
Figure 3:
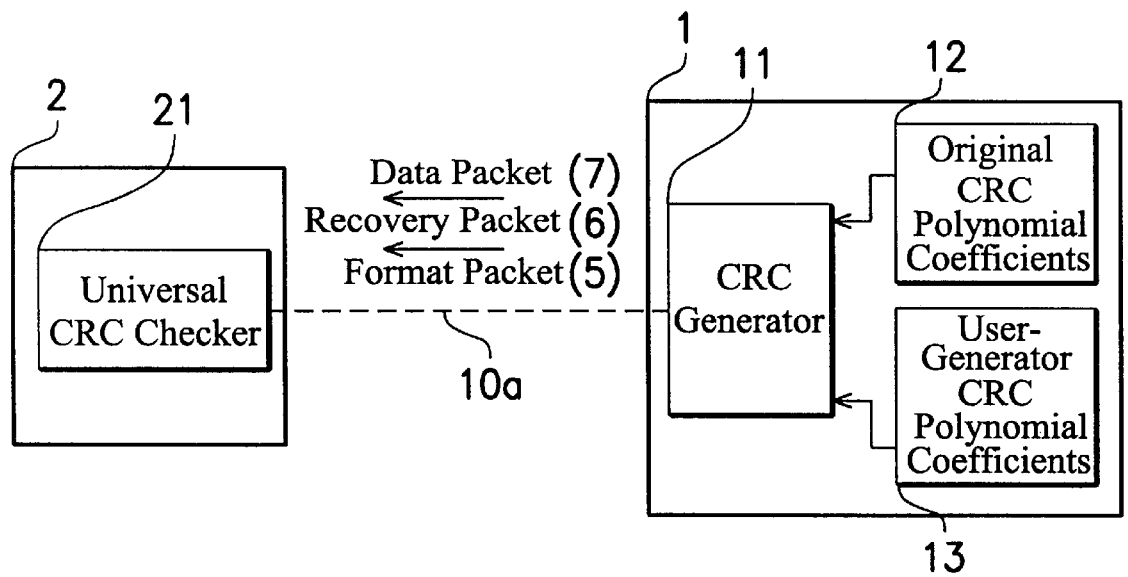
FIG. 3 illustrates a system block diagram showing the structure of the private transmission subsystem (comprising two network nodes) in the preferred embodiment of the present invention.

FIG. 3 illustrates a system block diagram showing the structure of the private transmission subsystem, including node 1 and node 2, and the packet flow during private transmission in this embodiment. In the following discussion, assume that node 1 is the data transmission source and node 2 is the data transmission destination. In other words, data is transmitted from node 1 to node 2, which is referred to as half-duplex communication. Although the following discussion refers to one-way transmission, the same techniques disclosed in this embodiment can also be directly applied to two-way transmission, which is usually referred to as full-duplex communication.

In FIG. 3, node 1, serving as the source, comprises CRC generator 11 and storage media for storing user-defined CRC-polynomial coefficients 13 and original CRC-polynomial coefficients 12. In this embodiment, CRC generator 11 is a general-purpose device, that is, the internal configuration of CRC generator 11 can be adjusted by the loaded CRC-polynomial coefficients. The flexibility of CRC generator 11 can facilitate the process of generating different types of CRC data corresponding to data having different security levels, such as general data and private data. Original CRC-polynomial coefficients 12 represent the coefficients of terms of the CRC polynomial originally adopted by the Ethernet. As described above, the original CRC polynomial is defined as:

$$G(x)=x^{32}+x^{26}+x^{23}+x^{22}+x^{16}+x^{12}+x^{11}+x^{10}+x^{8}+x^{7}+x^{5}+x^{4}+x^{2}+x+1 \quad (1)$$

Therefore, original CRC-polynomial coefficients 12 can be expressed by (100000100110000010001110110110111). User-defined CRC polynomial coefficients 13 are the coefficients of terms of the CRC polynomial used in the private data transmission. In this embodiment, the user-defined CRC polynomial G' (x) is defined as:

$$G'(x)=x^{10}+x^{9}+x^{8}+x^{6}+x^{5}+x^{3}+1 \quad (2)$$

Therefore, user-defined CRC polynomial G' (x) can be expressed by (11101101001).

In addition, node 2, serving as the destination, has a universal CRC checker 21, which can be adjusted by the loaded CRC polynomial coefficients. Universal CRC checker 21 is flexible and used to check the check data generated by various CRC polynomial. When universal CRC checker 21 is adjusted by the original CRC-polynomial coefficients defined in the Ethernet, its checking function is the same as that of the normal network node. When adjusted by the user-defined CRC-polynomial coefficients, universal CRC checker 21 can only be used to verify a packet with a check data generated by using the user-defined polynomial.

In this embodiment, during the private transmission, node 1 can sequentially send three kinds of packets to node 2. The three kinds of packets are format packet 5, data packet 6 and recovery packet 7. Format packet 5 is used to transmit the information of user-defined CRC-polynomial coefficients 13 specified by node 1 to node 2, thereby adjusting the configuration of universal CRC checker 21 and activating the private transmission. Note that the CRC data in format packet 5 is still generated by using the original CRC polynomial. Therefore, packet 5 can still be successfully verified by means of the normal CRC checking procedure. Data packet 6 is used to transmit the private data from node 1 to node 2. Note that the CRC data in data packet 6 is generated by using the user-defined CRC polynomial. Therefore, only node 2 can successfully verify the reception of data packet 6, but other nodes cannot. Recovery packet 7 is used to return node 2 to the normal state and terminates the private transmission. In this embodiment, recovery packet 7 contains the information about the original CRC-polynomial coefficients. When node 2 receives recovery packet 7, the original CRC-polynomial coefficients contained therein can be loaded in universal CRC checker 21 and recover the normal CRC checking function. Note that CRC data in recovery packet 7 is still generated by using the user-defined CRC polynomial. Therefore, only node 2 can successfully verify the reception of recovery packet 7. By means of these three kinds of packets, a private transmission path between node 1 and node 2 can be established within a specified period, which is defined by the transmission of format packet 5 and recovery packet 7.

Figure 2:
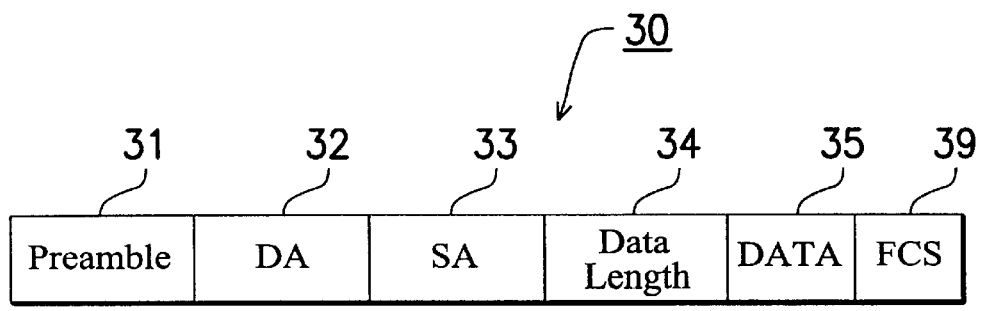
FIG. 2 (Prior Art) illustrates a packet format diagram showing the data structure of data packets defined in the Ethernet.
Figure 4:
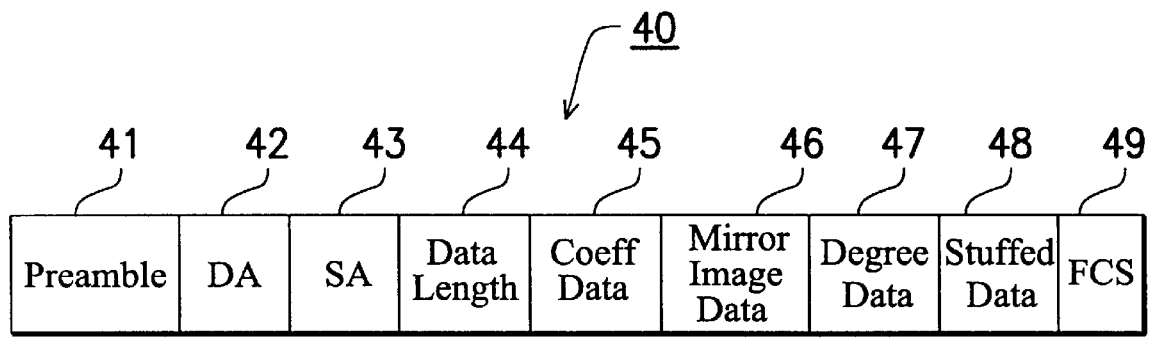
FIG. 4 illustrates a packet format diagram showing the data structure of the format packet and the recovery packet defined in the preferred embodiment of the present invention.

FIG. 4 illustrates a packet format diagram showing the data structure of format packet 5 in this embodiment. As shown in FIG. 4, format packet 5 contains several fields, including preamble 41, destination address (DA) 42, source address (SA) 43, data length 44, coefficient data 45, mirror image data 46, degree data 47, stuffed data 48 and FCS field 49. Preamble 41, DA 42, SA 43, data length 44 are the same as the corresponding fields of the normal packet shown in FIG. 2, and will be not described again.

Coefficient data 45 is used to store user-defined CRC-polynomial coefficients 13 specified in node 1. In this embodiment, the field length of coefficient data 45 is defined as 256 bits (or 32 bytes). According to user-defined CRC polynomial G' (x) (Equation (2)), the contents of coefficient data 45 in this embodiment should be:

[00]_[00]_[00]_[00]_[00]_[00]_[00]_[00]_
[00]_[00]_[00]_[00]_[00]_[00]_[00]_[00]_
[00]_[00]_[00]_[00]_[00]_[00]_[00]_[00]_
[00]_[00]_[00]_[00]_[00]_[00]_00000111_
01101001_ wherein [ . . . ] means the hexadecimal form, that is, [00]=00000000 (the binary form).

Mirror image data 46 is used to store the mirror image of user-defined CRC-polynomial coefficients 13. In this embodiment, the field length of mirror image data 46 is also defined as 256 bits. According to the contents of coefficient data 45, the contents of mirror image data 46 in this embodiment should be:

10010110_11100000_[00]_[00]_[00]_[00]_[00]_[00]_
[00]_[00]_[00]_[00]_[00]_[00]_[00]_[00]_
[00]_[00]_[00]_[00]_[00]_[00]_[00]_[00]_
[00]_[00]_[00]_[00]_[00]_[00]_[00]_[00]_

In this embodiment, mirror image data 46 can be used to identify whether a received packet is a format packet or not. Basically, format packet 5 still follows the data structure of a normal packet defined by the Ethernet. Therefore, when receiving a packet, node 2 should check the mirror relation between coefficient data 45 and mirror image data 46 with respect to the fixed field length of coefficient data 45 and mirror image data 46, in order to determine whether the received packet is a format packet or a normal packet.

Degree data 47 is used to indicate the highest degree of the user-defined CRC polynomial. In this embodiment, the field length of degree data 47 is defined as 2 bytes. For example, the contents of degree data 47 with respect to the user-defined CRC polynomial G' (x) should be (00000000_00001010). Stuffed data 48, which is optional, is used to adjust the packet length of format packet 5 to meet the requirement of minimum packet size. FCS field 49 of format packet 5 stores a CRC check data generated by using the original CRC polynomial.

The data structure of recovery packet 7 is the same as that of format packet 5 described above, but the contents are different. In a recovery packet, coefficient data 45, mirror image data 46 and degree data 47 are used to define the property of the original CRC polynomial G(x). In addition, FCS field 49 of format packet 7 stores a CRC check data generated by using the user-defined CRC polynomial G' (x).

The data structure of format packet 5 and recovery packet 7 described above should not be regarded as a limitation on the present invention. Any data structure previously agreed to by both transmission ends can also be applied to the present invention.

Figure 5:
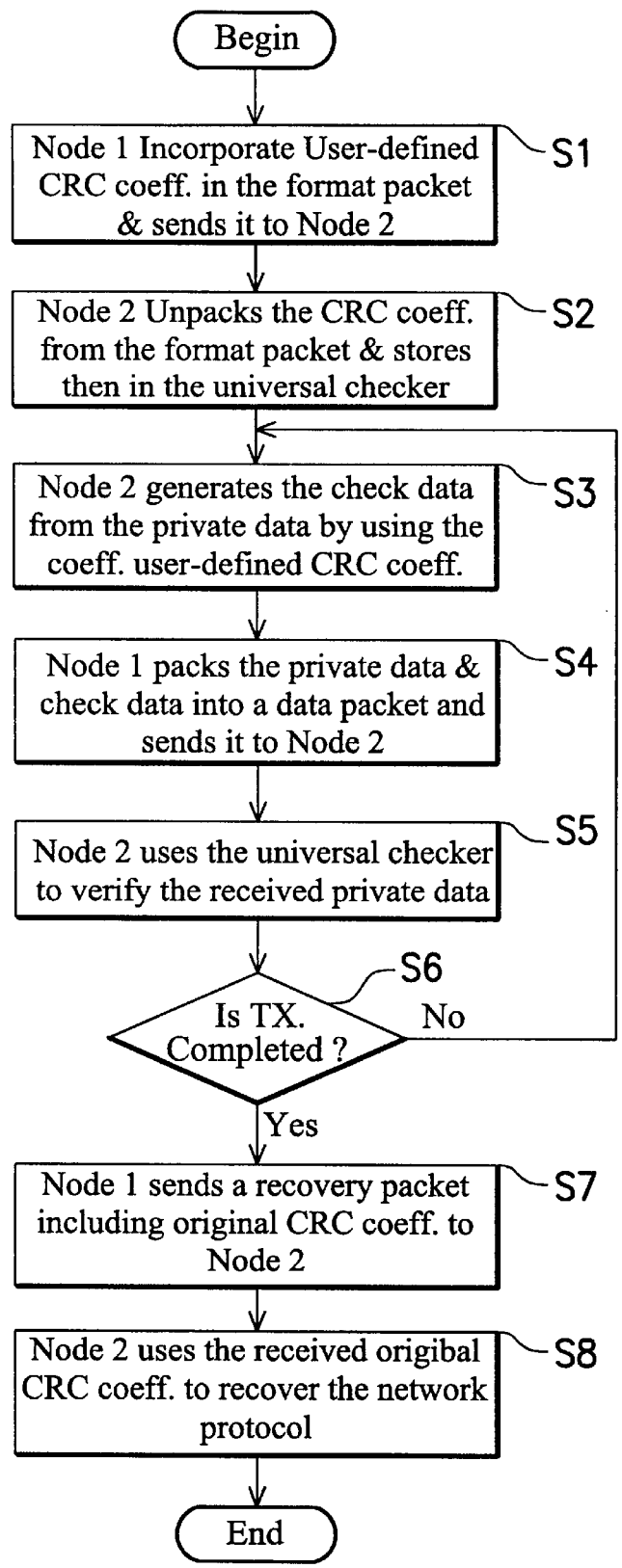
FIG. 5 illustrates a flowchart of the transmission of private data from one network node to another network node in the preferred embodiment of the present invention.

FIG. 5 illustrates a flowchart of the transmission of private data from node 1 to node 2 in this embodiment. Accompanying FIG. 5, the process of transmitting private data in this embodiment is described in detail. First, node 1 reads out the user-defined CRC-polynomial coefficients. Then the user-defined CRC-polynomial coefficients and a destination address indicating node 2 are incorporated into a format packet. Node 1 sends the format packet to the network (step S1). After receiving the format packet, node 2 can identify the format packet according to the mirror relation between the coefficient data and the mirror image data therein. Then node 2 unpacks the user-defined CRC-polynomial coefficients from the format packet and stores them in the universal checker (step S2). The adjusted universal checker is ready for receiving the private data packet having a CRC check data in response to the user-defined CRC-polynomial coefficients. Now node 1 and node 2 are placed in a state ready for the transmission of private data.

Next, node 1 loads the user-defined CRC-polynomial coefficients into its own CRC generator to adjust the status. Then the private data ready for transmission can be processed by the CRC generator to generate a corresponding check data (step S3). Then a data packet incorporating the private data and the corresponding check data is sent to node 2 (Steps S4). If the data amount of the private data exceeds the maximum packet size defined in the Ethernet, node 1 should cut the private data into several smaller segments, acquire check data corresponding to these smaller segments and sequentially send data packets incorporating these segments and the corresponding check data.

While receiving the data packet containing the private data or a part of the private data, node 2 employs the adjusted universal CRC checker to verify the correctness of the received data packet (step S5). If no transmission error occurs, node 2 can successfully complete the reception of the data packet containing the private data. On the other hand, since other network nodes (without universal CRC checkers) cannot verify its check data, the received packet will be regarded as incorrect and then abandoned. Steps S3 to S5 will be recursively performed until the transmission process for the private data is completed (step S6).

When the private data is completely transmitted to node 2, node 1 sends a recovery packet incorporating the original CRC-polynomial coefficients to node 2 for returning node 2 to the normal state complying with the original protocol defined in the Ethernet (step S7). After receiving the recovery packet, node 2 unpacks the original CRC-polynomial coefficients from the recovery packet and downloads to the universal CRC checker for recovering the normal network protocol (step S8). At this point, all the necessary steps for performing the private transmission are completed.

Figure 6:
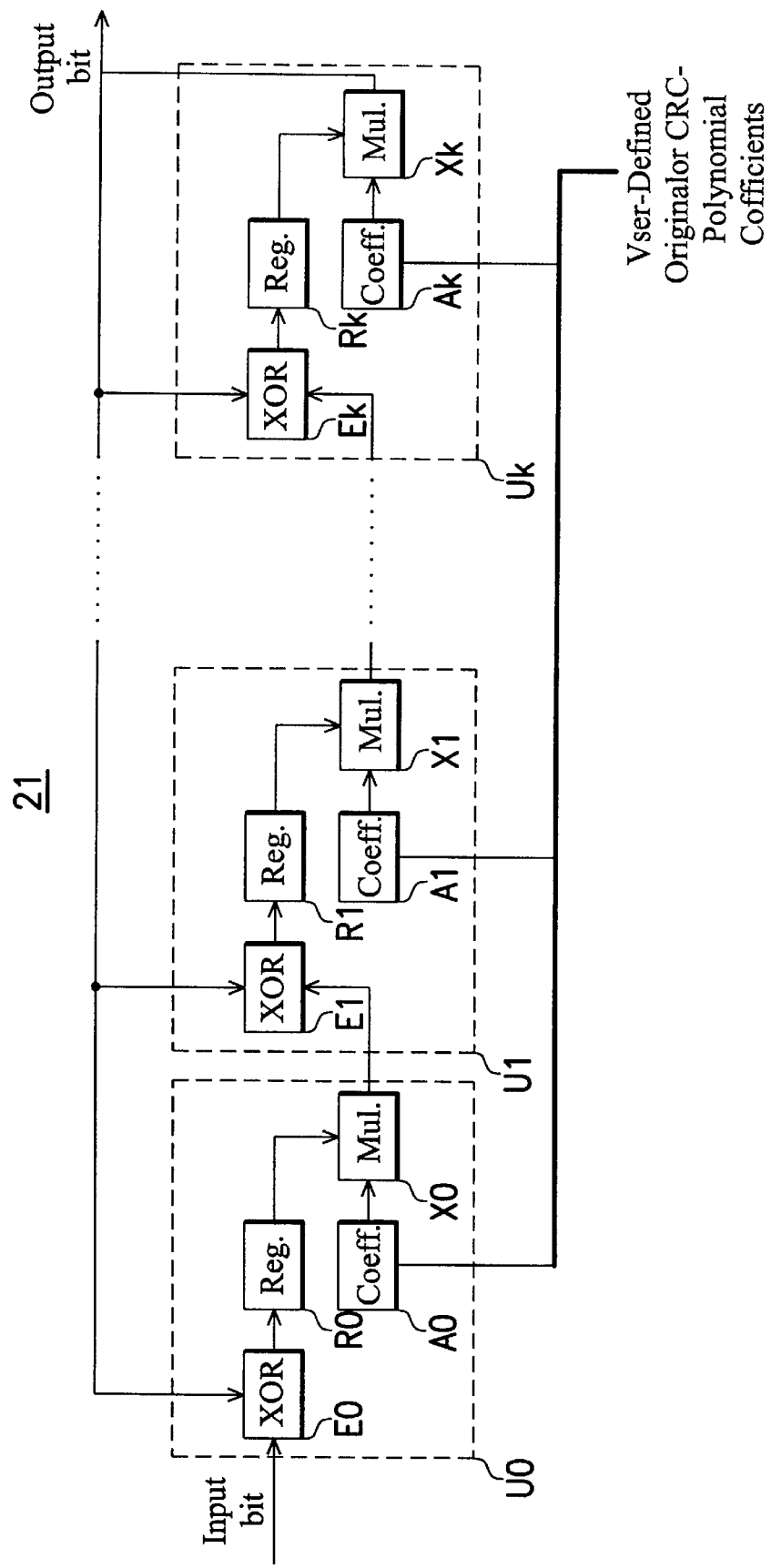
FIG. 6 shows a block diagram of an example of the universal checker employed in the preferred embodiment of the present invention.

Finally, universal CRC checker 21 or CRC generator 11 in this embodiment can be implemented in accordance to the block diagram shown in FIG. 6. FIG. 6 shows a block diagram of an example of universal CRC checker 21. As shown in FIG. 6, universal CRC checker 21 comprises a plurality of processing units U0~Uk, which correspond to the coefficients of the terms of the original CRC polynomial $G(x)$ or user-defined CRC polynomial $G'(x)$, respectively. Each processing unit (U0~Uk) further comprises an XOR gate (E0~Ek), a register (R0~Rk), a storage medium for storing polynomial coefficients (A0~Ak) and a multiplier (X0~Xk). Before operation, user-defined CRC polynomial coefficients (corresponding to format packet 5) or original CRC-polynomial coefficients (corresponding to recovery packet 7) should be loaded, respectively, to the corresponding coefficient storage media for setting the status. As shown in FIG. 6, XOR gate E0 of the processing unit U0 performs an XOR operation on an input bit and an output bit, and the XOR gates E1~Ek of the other processing unit U1~Uk performs an XOR operation on the output of the multiplier of the preceding processing unit and the output bit. In addition, the multipliers X0~Xk multiply (or perform an AND operation of) the data stored in the corresponding registers R0~Rk and the corresponding coefficients A0~Ak. The multiplication results of the multipliers are sent to the XOR gates of the next processing units, except that the multiplication result of the last multiplier Xk serves as the output bit. The registers R0~Rk are used to store the results of the XOR gates in the same processing unit. In this embodiment, the data length of the CRC-polynomial coefficients is 256 bits. Therefore, there are 256 processing units in the universal CRC checker 21. Using the structure shown in FIG. 6, the status of the universal CRC checker 21 can be adjusted by the loaded coefficients and check the packets with a CRC check data generated by using the corresponding coefficients.

In this embodiment, only one user-defined CRC polynomial is used to perform the private transmission. In the practical situation, many user-defined CRC polynomials can be previously maintained in the network nodes requiring the private transmission service, but only one user-defined CRC polynomial is chosen for performing the practical private transmission. In addition, the selected CRC polynomial also can be altered during the private transmission.

According to the processing method and the network system described above, the advantages of the present invention can be described as follows:

1. Normal network nodes cannot successfully receive packets incorporating private data due to the inability to utilize a flexible checking manner. Therefore, other network nodes cannot intercept the private data.
2. A network node trying to intercept the private data may first intercept the format packet 5 carrying a normal check data to retrieve the user-defined CRC-polynomial coefficients. However, because the intercepting node lacks the universal CRC checker, this network node still cannot perform an appropriate CRC check using the retrieved coefficients to check the retrieved packets containing the private data.
3. In fact, as described above, the data structure of format packet 5 and recovery packet 7 is determined in advance by both communication ends. In addition, the determined data structure should still comply with the normal protocol defined in the Ethernet. Therefore, the separation of the user-defined CRC-polynomial coefficients from format packet 5 requires not only judgement as to which packet is a format packet, but also knowledge of the previously determined data structure of format packet 5. In this manner, merely skipping the CRC checking mechanism to intercept the private data also results in the problem that the retrieved information contains transmission errors. Therefore, the variety of the data structure of format packet 5 increases the secrecy of the transmitted private data.

In this embodiment, the determined user-defined CRC-polynomial coefficients are communicated by means of format packet 5. However, it is understood by those skilled in the art that the user-defined CRC-polynomial coefficients can be in advance determined and known by both communication terminals. Before the transmission of private data, the determined user-defined CRC-polynomial coefficients are loaded to the universal CRC checker in the receiver end and to the CRC generator in the transmitter end. This method omits the step of transmitting the polynomial information by means of the format packet. The purpose of omitting the format packet transmission step is to increase the secrecy of the determined user-defined CRC-polynomial coefficients. Such a method also can establish a private transmission path in a public network for transmitting private data.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for performing the transmission of private data between a first network node and a second network node of a public network, comprising the steps of:

installing a universal checker in the second network node;

sending a format packet having a set of checker-polynomial coefficients from the first network node to the second network node;

receiving and storing the set of the checker-polynomial coefficients in the universal checker of the second network node;

generating a check data associated with the private data according to the set of the checker-polynomial coefficients in the first network node;

sending a data packet including the private data and the check data from the first network node to the second network node; and verifying the check data by using the universal checker in the second network node for checking the correspondence between the private data and the check data.

2. The method as recited in claim 1, further comprising the steps of:

sending a recovery packet including a set of original checker-polynomial coefficients defined in the public network from the first network node to the second network node; and storing the set of the original checker-polynomial coefficients in the universal checker of the second network node.

3. The method as recited in claim 1, wherein the public network is an Ethernet and the check data is stored in the FCS field of the data packet.

4. The method as recited in claim 1, wherein the format packet further comprises a checker-polynomial length data for representing the highest degree associated with the set of the checker-polynomial coefficients.

5. The method as recited in claim 1, wherein the format packet further comprises a mirror image data with respect to the set of the checker-polynomial coefficients, and the second network node uses the mirror image data to identify the format packet or not.

6. The method as recited in claim 1, wherein the checker-polynomial coefficients are coefficients of a CRC generating function.

7. A system for performing the transmission of private data over a public network, comprising:
    a first network node having a check-data generating device for generating a check data in response to the private data by using a set of checker-polynomial coefficients, the first network node sequentially sending a format packet having the set of the checker-polynomial coefficients and a data packet having the private data and the check data to the public network; and
    a second network node having a universal checker for checking the check data generated by the first network node, the second network node storing the set of the checker-polynomial coefficients in the universal checker when receiving the format packet, and checking the correspondence between the private data and the check data by using the universal checker when receiving the data packet.

8. The system as recited in claim 7, wherein the checker-polynomial coefficients are coefficients of a CRC generating function.

9. The system as recited in claim 7, wherein the public network is an Ethernet and the check data is stored in the FCS field of the data packet.

10. The system as recited in claim 7, wherein the format packet further comprises a checker-polynomial length data for representing the highest degree associated with the set of the checker-polynomial coefficients.

11. The system as recited in claim 7, wherein the format packet further comprises mirror image data with respect to the set of the checker-polynomial coefficients, and the second network node uses the mirror image data to identify the format packet or not.

12. The system as recited in claim 7, wherein the first network node sends a recovery packet including a set of original checker-polynomial coefficients defined in the public network to the second network node after sending the data packet, for recovering the state of the universal checker in the second network node.

13. A method for performing the transmission of private data between a first network node and a second network node of a public network, comprising the steps of:
    installing a universal checker in the second network node;
    storing a pre-defined set of checker-polynomial coefficients in the universal checker of the second network node;
    generating a check data associated with the private data by using the pre-defined set of checker-polynomial coefficients in the first network node;
    sending a data packet including the private data and the check data from the first network node to the second network node; and
    verifying the check data by using the universal checker in the second network node for checking the correspondence between the private data and the check data.

14. The method as recited in claim 13, wherein the public network is an Ethernet and the check data is stored in the FCS field of the data packet.

15. The method as recited in claim 13, wherein the pre-defined checker-polynomial coefficients are coefficients of a CRC generating function.

16. The method as recited in claim 13, wherein the pre-defined checker-polynomial coefficients are different with the original checker-polynomial coefficients defined in the public network.

* * * * *